United States Patent Office 2,796,442
Patented June 18, 1957

2,796,442

PROCESS FOR THE PRODUCTION OF COMPOUNDS OF THE DIACETYLENE SERIES

Walter Franke and Herbert Meister, Marl, Westphalia, Germany, assignors to Chemische Werke Huls Aktiengesellschaft, Marl, Kreis Recklinghausen, Germany, a corporation of Germany No Drawing. Application September 26, 1955, Serial No. 536,769

Claims priority, application Germany November 13, 1954

2 Claims. (Cl. 260—615)

It is known that compounds of the diacetylene series are produced when compounds of the acetylene series are oxidized with molecular oxygen in the presence of an aqueous solution of cuprous chloride and ammonium chloride. It has been proposed to oxidize alcohols of the acetylene series to diacetylene glycol with the aid of solutions of basic salts of divalent copper. If however, it is attempted by this process to oxidize 1-methoxybutene-1-ine-3 which has been technically available for a long time the principal product is a brown resinous product and only a small percentage of 1,8-dimethoxyoctadiene-1,7-diine-3,5.

It has been found that compounds of the diacetylene series can be made advantageously from 1-alkoxybutene-1-ine-3 by oxidation with molecular oxygen in the presence of catalytic amounts of cuprous salts if the reaction is carried out in the presence of ammonia or an amine. Amines which form addition compounds with the copper salt, for example cuprous chloride, are especially suitable. Examples of such amines are cyclohexylamine, methylaniline, diethylamine, morpholine and pyridine. These amines can be added to the oxidation mixture in large amounts wherein they may serve as solvents or diluents for the 1-alkoxybutene-1-ine-3. Or they can be used in smaller amounts of the order of 10% or less by weight calculated on the weight of the acetylene compound. Especially in the latter case it is advisable to add other organic diluents such as alcohols, e. g. methanol, esters, nitriles, hydrocarbons etc. The process can be carried out in the presence of water which remains unchanged. The cuprous salt which serves as oxidation catalyst, for example cuprous chloride, may be used in small amounts of the order of 5% or less calculated on the weight of the acetylene compound. Larger amounts for example, molar or multimolar amounts with reference to the acetylene compound are not necessary but are not harmful.

The oxidation starts at temperatures below 0° C. with air or oxygen which preferably is introduced in finely divided form. It is expedient to operate at room temperature and to remove the heat generated by the oxidation by cooling. At room temperature the oxidation proceeds rapidly and is practically complete in a few hours.

The so-obtained 1,8 - dialkoxyoctadiene-1,7-diine-3,5 can be recovered from the reaction mixture simply, for example, by a careful distillation. In general however, it is preferred to convert this rather sensitive compound without separation from the reaction mixture into a less sensitive compound. For example, by careful hydrogenation it can be converted into the corresponding octanedioldialkylether, and then the catalyst and the added amine and the solvent may be separated from the reaction mixture.

This invention is further described and illustrated by the following specific examples.

Example 1

An excess of oxygen is passed through and expediently circulated through a mixture of 164 g. of 1-methoxybutene-1-ine-3 (2 mols), 100 ccm. of cyclohexylamine and 5 g. of cuprous chloride at 20° C. for 6 hours. The reaction heat is removed by cooling. The reaction mixture is then filtered and the filtrate diluted with methanol and the resulting solution is treated with hydrogen in the presence of Raney-nickel catalyst under pressure, first at room temperature and then while gradually increasing the temperature up to 150° F. The reaction mixture is filtered and the filtrate subjected to fractional distillation under reduced pressure thereby producing 140 g. of octanediol-1,8-dimethyl ether within the boiling range 90–120° C. at 11 mm. of mercury pressure. The yield is over 80%. By further distillation within the range 120–190° C. at a pressure of 11 mm. of mercury additional compounds of the $C_8$ series are produced.

Example 2

As in Example 1 oxygen is passed at 20° C. for 4 hours through a mixture of 164 g. of 1-methoxybutene-1-ine-3, 8 g. of pyridine and 2 g. of cuprous chloride. The filtrate from the reaction mixture is diluted with methanol and hydrogenated under pressure with Raney nickel catalyst. 129 g. of octanedioldimethylether are produced, this being a yield of 74%.

Example 3

A mixture of 8 g. of pyridine, 164 g. of 1-methoxybutene-1-ine-3 and 2 g. of cuprous chloride is diluted with 50 ccm. of methanol and treated with oxygen as in Example 1 and then hydrogenated. The yield of octanedioldimethylether is 139 g. which amounts to 80% of the theoretical yield.

Example 4

Oxygen is passed for 8 hours as described in Example 1 through a mixture of 124 g. of 1-butoxybutene-1-ine-3, 40 g. of methanol, 8 g. of pyridine and 3 g. of cuprous chloride. After hydrogenation 80 g. of octanedioldibutyl ether, boiling point 162–164° C. at 11 mm./Hg are obtained representing a yield of 62%. Dibutylether produced by the hydrogenation of unreacted butoxybutenine was formed in the fore-running.

We claim:
1. In a process for the production of a 1,8-dialkoxyoctadiene-1,7-diine-3,5 by oxidizing a 1-alkoxybutene-1-ine-3 with oxygen in the presence of a cuprous salt, the improvement which consists in effecting the oxidation in the presence of an amine selected from the group consisting of cyclohexylamine, methylaniline, diethylamine, morpholine and pyridine.
2. Process as defined in claim 1, in which the reaction is carried out in the presence of an organic solvent.

References Cited in the file of this patent

FOREIGN PATENTS 175,560    Austria _____ July 25, 1953

OTHER REFERENCES

Jones et al.: J. Chem. Soc. (1947), p. 1581.
Jones et al.: J. Chem. Soc. (1952), pp. 1998–1999.